Patented Oct. 9, 1928.

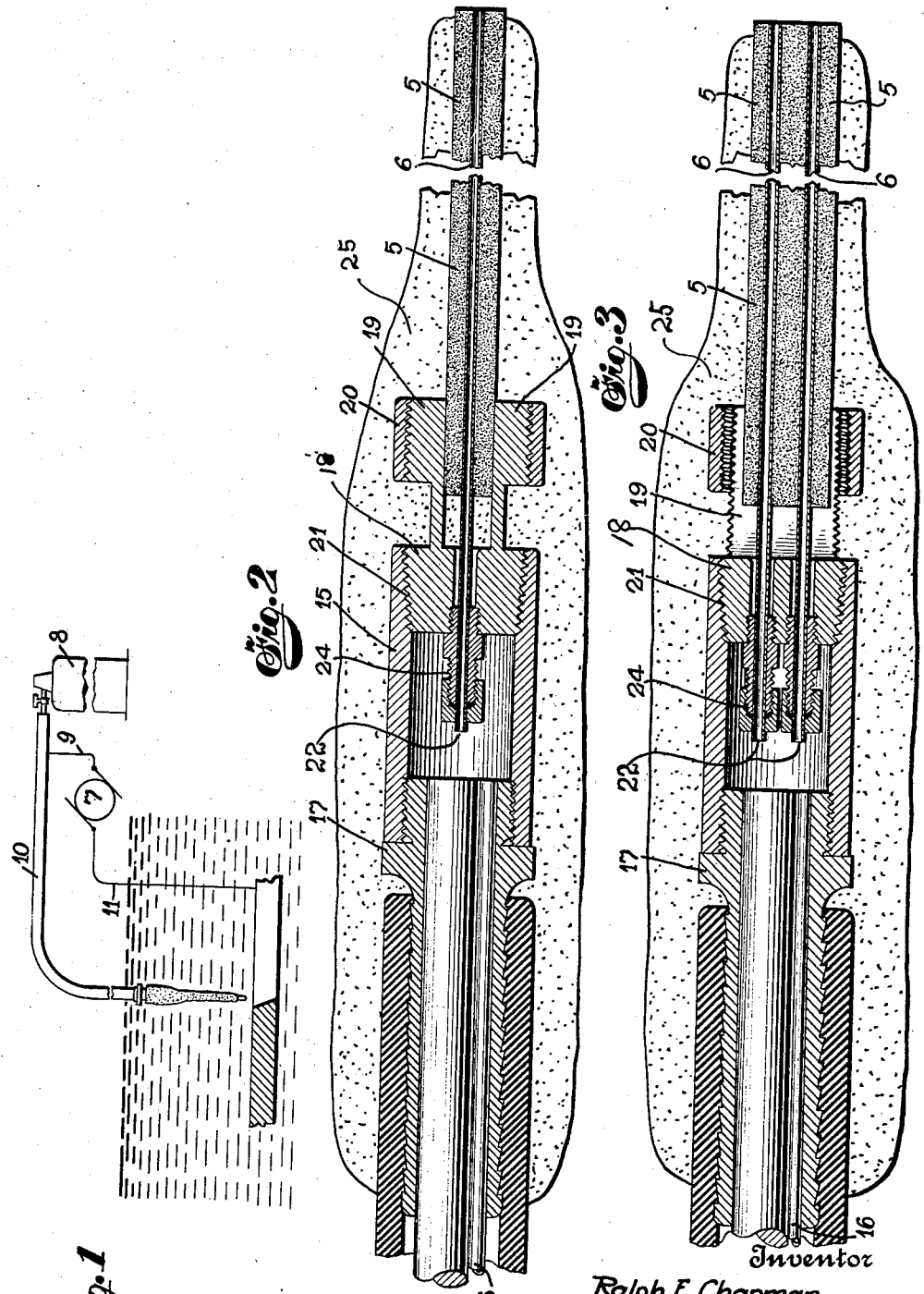

1,687,081

UNITED STATES PATENT OFFICE.

RALPH E. CHAPMAN, OF MIAMI, FLORIDA.

APPARATUS FOR CUTTING OR WELDING METAL.

Application filed October 9, 1925. Serial No. 61,391.

The present invention relates to apparatus for use in producing an electric arc of the type which may be used, for example, in cutting or welding metal. The invention has for an object to provide improved means for attaching an electrode to a holder to facilitate the replacement of a used electrode with a fresh one.

The invention has been developed in connection with the making of apparatus for cutting metal under water and, for the purposes of illustration, an apparatus designed primarily with this object in view will be more particularly described but it will be understood that this description is illustrative merely and is not intended as defining the limits of the invention.

The nature and objects of the invention will be better understood from a description of a particular illustrative embodiment thereof for the purposes of which description reference should be had to the accompanying drawings forming a part hereof and in which:

Figure 1 is a diagrammatic view indicating the manner of use of the device to be described for cutting metal under water;

Figure 2 is a central sectional view of an electrode holder embodying the invention;

Figure 3 is a central sectional view taken on a plane at right angles to the plane of the section shown in Fig. 2.

Referring more particularly to the apparatus shown in the drawing an electrode 5 having one or more air passages 6 therethrough is connected to a suitable source of electric current shown diagrammatically as a direct current generator 7 and to a suitable source of air or other gas shown diagrammatically as a compressor 8 by means of an electric conductor 9 and a hose 10. The work may be connected to the generator by a conductor 11 to complete the electric circuit.

In the use indicated the electrode preferably forms the negative and the metal to be cut the positive of an arc, and air or other suitable gas or gases is supplied to the arc either to increase the heat at the working point or to oxidize the heated metal or both.

The conductor 9 and hose 10 terminate in a hollow holder 15 to the body of which the conductor is connected and to the interior of which the gas or air is supplied through tubes 16. The conductor conveniently may be within the hose for a suitable part of its length. If only one gas is to be supplied to the arc, the hose may serve as the conductor thereof and the tubes 16 may be made short extending merely through the body of the holder and opening into the interior of the hose.

To facilitate removal of a short used electrode and replacement by a fresh one, the electrode is detachably connected to the holder with the air passages through the electrode in communication with the interior of the holder.

The arrangement shown comprises a clamp member 18 having opposed jaws 19 which are drawn together against the electrode by a nut 20. The rear end of the clamp is threaded to be received in a suitable socket 21 of the holder with which it forms a substantially air and water tight joint.

Air tubes 22 are connected with the air passages which extend longitudinally through the electrode and may, as in the structure shown, extend through the full length of the electrode and in fact form the air passages. The tubes shown are made of copper with thin walls and in use are consumed in the arc as rapidly as the electrodes. These tubes project at the clamped end of the electrode and are extended through passages in the body of the clamp and into the interior of the holder. Packing glands 24 are provided to form an air and water tight joint with the clamp. The arrangement illustrated is designed to be used with only air or one gas and the air tubes 22 are therefore not separately connected to corresponding tubes 16 but merely open into the interior of the holder as do the tubes 16. The connection between the clamp and holder may therefore be a simple screw plug and socket connection as shown.

The holder and clamp are encased for use in suitable insulation 25 which may consist in whole or in part of tape wound on after the electrode is connected and extended more or less along the electrode to be burned off as the electrode is consumed.

The arrangement shown is illustrative merely and variation in the structure and arrangement may be made without departing from the scope of the appended claims.

I claim:

1. A tool of the character described comprising, in combination, an electrode having an air passage therethrough, a hose, a clamp having an air passage therethrough connected to said hose and adapted to hold said electrode with the air passage of the electrode connected with the air passages through the clamp and hose, a holder to which said clamp is detachably connected, and an electrical conductor extending through the hose and connected to the electrode.

2. A tool of the character described comprising, in combination, an electrode having an air passage therethrough, a clamp having an air passage therethrough and having adjustable jaws for clamping said electrode, means for maintaining air tight continuity between the air passages of the electrode and of the clamp, and a holder to which electrical current and air may be supplied and to which the clamp is detachably connected.

3. A tool of the character described comprising, in combination, an electrode having an air passage therethrough and a tube connected to said air passage and extending beyond one end of the electrode, a clamp having jaws for holding said electrode and having a hole through which the tube extends and a packing gland for making air tight connection between the tube and the clamp, a hollow holder to which said clamp is attachable with the tube projecting into the hollow of the holder and forming a substantially water tight joint.

4. A tool of the character described comprising, in combination, an electrode having an air passage therethrough and a tube connected to said air passage and extending beyond one end of the electrode, a clamp having means for clamping one end of the electrode and having an aperture through which the air tube extends and with which it forms an air tight joint.

5. A tool of the character described comprising, in combination, an electrode having an air passage therethrough and a tube connected to said air passage and extending beyond one end of the electrode, a clamp having means for clamping one end of the electrode and having an aperture through which the air tube extends and with which it forms an air tight joint, a hollow holder arranged to be connected to an air supply and to an electrical conductor, said clamp being detachably connected to the holder with the air tube connected with the hollow of the holder and with its body in electrical connection with the body of the holder.

6. An apparatus of the character described comprising, in combination, a hose, an electrical conductor therein, a hollow holder secured to one end of the hose with the hose in communication with the interior of the holder and with the conductor in electrical connection with the body of the holder, an electrode having an air passage therethrough and a tube associated therewith and extending beyond one end of the electrode, a clamp to which the electrode is detachably connected with the tube extending through the clamp and forming an air tight joint therewith, said clamp being attachable to the holder to provide electrical connection between the electrode and the body of the holder and communication between the interior of the holder and the air passages of the electrode.

7. An apparatus of the character described comprising, in combination, an electrical conductor and gas tubes, a hollow holder electrically connected to the conductor with the gas tubes connected to the interior thereof, an electrode having air passages therethrough, a clamp to which the electrode is detachably connected having air passages with which the air passages of the electrode are severally connected, said clamp being detachably secured to the holder with the air passages therethrough connecting with the gas tubes.

8. An apparatus of the character described comprising, in combination, a hose, an electrical conductor, a holder connected to both, an electrode having air passages therethrough detachably connected to the holder with the air passage in communication with the hose, and insulating material surrounding and enclosing the holder to provide an insulated handle.

In testimony whereof, I have signed my name to this specification this 24th day of September, 1925.

RALPH E. CHAPMAN.